US006782446B2

(12) United States Patent
Akey et al.

(10) Patent No.: US 6,782,446 B2
(45) Date of Patent: Aug. 24, 2004

(54) METHOD TO PREVENT CORRUPTION OF PAGE TABLES DURING FLASH EEPROM PROGRAMMING

(75) Inventors: David W. Akey, Keizer, OR (US); Mark T. Gross, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 371 days.

(21) Appl. No.: 09/935,422

(22) Filed: Aug. 22, 2001

(65) Prior Publication Data

US 2003/0041222 A1 Feb. 27, 2003

(51) Int. Cl.[7] .............................................. G06F 13/00
(52) U.S. Cl. ...................... 711/103; 711/205; 711/158; 711/159; 711/168; 711/162
(58) Field of Search ................................ 711/103, 202, 711/203, 204, 205, 206, 207, 209, 158, 159, 168, 162

(56) References Cited

U.S. PATENT DOCUMENTS

| | | | | | |
|---|---|---|---|---|---|
| 5,918,250 A | * | 6/1999 | Hammond | ................... | 711/205 |
| 5,918,251 A | * | 6/1999 | Yamada et al. | ............. | 711/207 |
| 6,065,091 A | * | 5/2000 | Green | ........................... | 711/3 |
| 6,351,797 B1 | * | 2/2002 | Beard et al. | ................ | 711/207 |
| 6,377,502 B1 | * | 4/2002 | Honda et al. | .......... | 365/230.03 |
| 6,571,307 B1 | * | 5/2003 | Kuo et al. | .................. | 710/305 |

* cited by examiner

*Primary Examiner*—Hong Kim
(74) *Attorney, Agent, or Firm*—Blakely, Sokoloff, Taylor & Zafman LLP

(57) ABSTRACT

A page table method that allows programming of flash memory without corrupting the translation lookaside buffers is described. Flash memory is used to store page tables and other data. In one embodiment of the invention, the page tables are shadowed in random access memory after system bootup to prevent the system from crashing in the event the page tables are accessed while the read only memory is being programmed. In a second embodiment of the invention, the translation lookaside buffers are pre-charged.

10 Claims, 3 Drawing Sheets

METHOD TO PREVENT CORRUPTION OF PAGE TABLES DURING FLASH EEPROM PROGRAMMING

FIELD OF THE INVENTION

The present invention pertains to the field of flash memory. More particularly, the present invention relates to a method of preventing page table corruption in RAM during flash memory programming.

BACKGROUND OF THE INVENTION

Flash memory is used in a wide variety of products including many types of computing, communication, and consumer electronic devices. Flash memory is a type of nonvolatile memory. Flash memory is typically organized as a memory array. Each memory array is usually composed of thousands of individual flash memory cells. Operations such as writing, reading, and erasing can be performed on flash memory. However, only one operation can typically be performed on a flash memory array at a time. For example, during a memory array write operation, a read operation cannot be performed at the same time.

Because flash memory enables the CPU to access programs without having to load them off a disk drive, flash memory is often used for storing applications such as startup programs. Page tables are also often stored in flash memory to enable access of the page tables immediately after system bootup. Alternatively, page tables can be stored in random access memory (RAM). Page tables are typically used for address translations of virtual memory addresses or logical memory addresses. Virtual memory divides physical memory into blocks and then allocates the memory blocks to different processes. Thus, page tables are often used to translate virtual memory addresses to physical memory addresses.

Logical memory addresses are addresses used in programs. Programs use logical memory addresses to access specific locations of the main memory. Aside from translating virtual memory addresses, page tables are used to map logical memory addresses to physical memory addresses.

Page tables are data structures that are indexed by the page or segment number that contain the physical address of the physical memory block. Each page is defined as a block of the physical memory or a 4 KB area of address space. The translation process generally includes accessing flash memory or wherever the page table is stored to obtain the physical memory address. In order to make the translation process more efficient, personal computers often use a translation lookaside buffer (TLB). The TLB is a cache dedicated to address translations. The TLB makes translations more efficient by eliminating the constant need to reread the page table from memory.

Because traditional magnetic disk drives are external to the computer system, accessing page tables from a magnetic disk drive is inefficient. Therefore, page tables are generally stored in main memory. However, when a computer system utilizes a Memory Management Unit (MMU), the page tables are typically stored in flash memory. The MMU is an embedded system with fixed memory attributes and addressing constraints.

Computer processors that use a MMU typically utilize page tables to control caching. Such a system can be found in portable digital audio players. An MP3 player is an example of a portable digital audio player. MP3 is a file format often used for sharing music over the internet.

BRIEF DESCRIPTION OF THE DRAWINGS

The present invention is illustrated by way of example and not limitation in the figures of the accompanying drawings, in which like references indicate similar elements and in which.

DETAILED DESCRIPTION

In one embodiment of the invention, the MMU is a hardware system that includes a TLB with 64 page entries. Each of the 64 page entries consists of a 16 KB boundary. The TLB serves as a cache for page table entries. Thus, when a page is accessed in memory, the MMU loads the translation information into one of the TLB locations. A pointer tracks the TLB entries and determines the location to store each subsequent translation address. When the TLB determines a location to store the information, the pointer removes the old contents and replaces the memory location with the translation information. If the MMU lacks the ability to identify frequently used translations, each TLB entry will be accessed sequentially.

In the present embodiment of the invention, the MMU page tables are stored in flash electrically erasable programmable read only memory (EEPROM). The flash EEPROM acts similar to a read only memory in this instance of storing MMU page tables. The contents of the page tables in EEPROM are generally not changed, although the EEPROM contains other data as well that do require updating. The page tables must be available immediately after power-up and system resets. The MMU boots the system and loads firmware applications. The page tables are used to map logical addresses of programs to physical addresses.

After power-up and system resets, the flash EEPROM begins at memory location zero. The logical addresses and physical addresses are completely unrelated. Therefore, the logical addresses are mapped to correlate with their physical addresses. Because the flash EEPROM also stores data, the TLB is needed regardless of whether the logical and physical addresses have identical values. The complexity of requiring a TLB in situations where the logical and physical addresses are identical can be avoided by having two separate sets of flash EEPROMs. One EEPROM would be used only for firmware and the other EEPROM would be used only for data. However, this implementation is not always desirable since adding another memory array will increase cost. In addition, on very large, dense chips, the option of having an abundant amount of memory storage space is typically not viable.

Despite the benefits of utilizing only one flash EEPROM for both firmware and data, there are potential problems with the implementation if data corruption issues are not properly addressed. Generally, it is undesirable to store page tables in memory locations that are programmed frequently. For example, the programming of flash EEPROM with data can potentially corrupt the page tables and result in program failure. Corruption is a threat to occur if flash EEPROM is inaccessible during programming. If an address is accessed that does not have a translation entry already in the TLB, the page table will become corrupted.

Figure 1:
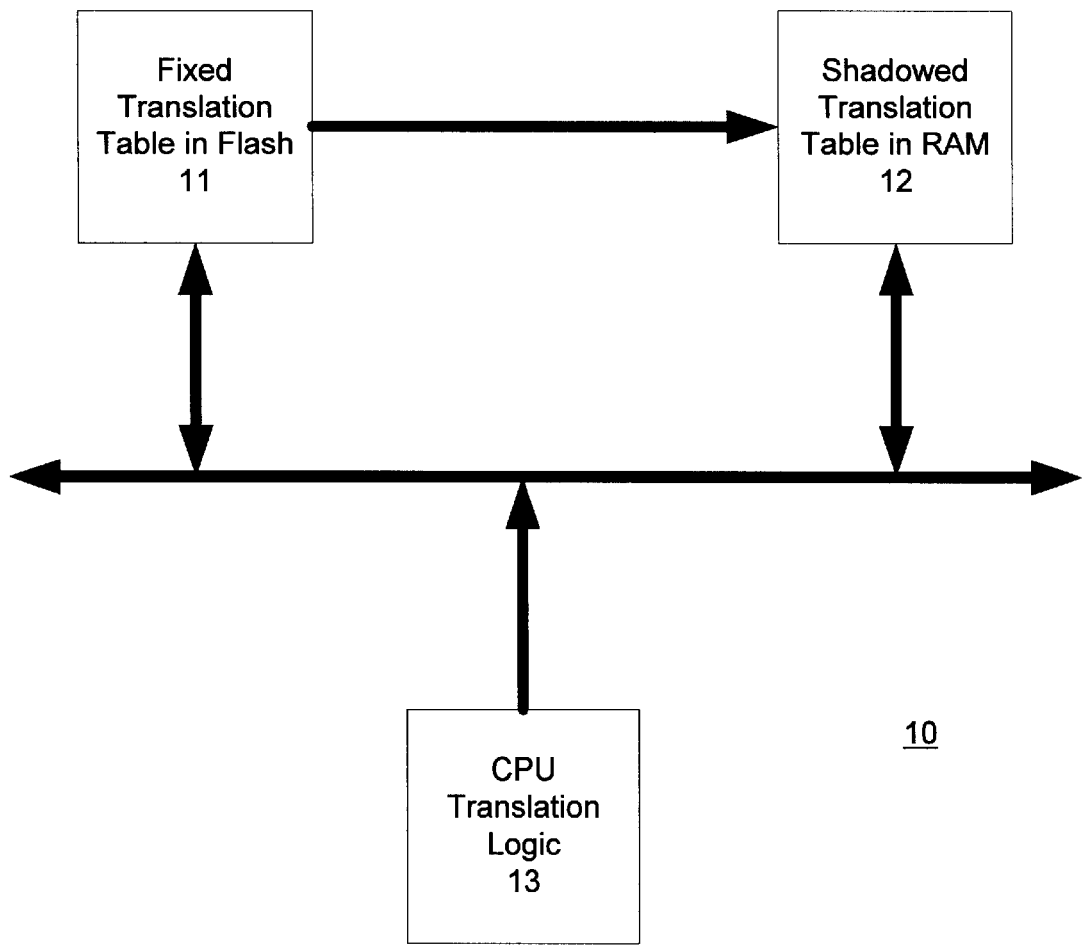
FIG. 1 shows a block diagram that illustrates an embodiment of the shadowing page table of the present invention.

One method of avoiding data corruption is through the use of a MMU shadowing page table in RAM. FIG. 1 shows a block diagram that illustrates an embodiment of the shadowing page table of the present invention. Initially, at power-up and system resets, the page tables are stored in flash EEPROM 11. After startup and system resets, the boot copies the page table to RAM 12. The page table copy in RAM 12 "shadows" the page table stored in flash EEPROM 11. The contents of the shadowed page tables of RAM 12 are static in the invention. However, in other embodiments of the invention, the contents of the shadowed page tables of RAM 12 may be modified as needed.

The RAM memory space is preallocated and has specific requirements. Each of the shadowed page table entries 12 has a 16 KB boundary requirement. In addition, the shadowed page tables 12 have to be placed in the same memory locations in the RAM as in the flash EEPROM. As a result, the contents of the MMU in the flash EEPROM including operational code are copied into RAM. Having the operational code in RAM allows execution of the operational code from RAM most of the time since the central program of the MMU table is in the RAM. Once the page tables in flash EEPROM 11 are shadowed in RAM 12, the CPU translation logic 13 accesses the shadowed page tables 12 through a system bus.

As previously stated, one application for the invention is for use in portable digital audio players. Portable digital audio players are typically used to read MP3, wav, and other file formats. When a portable digital audio player downloads music or updates firmware, the flash EEPROM enters into the programming or writing mode. A universal serial bus is one manner in which commands for music downloads or firmware updates can be received.

Firmware is typically software stored in flash memory that enables the operation of the player. If the CPU requests an address translation from the flash memory during the programming operation, the system has a tendency to crash. When music is downloaded or firmware is updated, the data is stored or programmed in flash memory. The system crashes as a result of the CPU's attempt to load data from flash based page tables while the flash memory is busy being programmed. This results in the CPU MMU being loaded with invalid information. When the CPU subsequently attempts to load code, the system crashes because the CPU MMU data is corrupted.

Loading corrupted data is potentially harmful and may cause the chip to lock up when the CPU attempts to address data or code with corrupted MMU. Therefore, shadowing copies of the page table in RAM for use during programming will help alleviate the corruption problems because the CPU will fetch the code from somewhere other than flash EEPROM.

Figure 2:
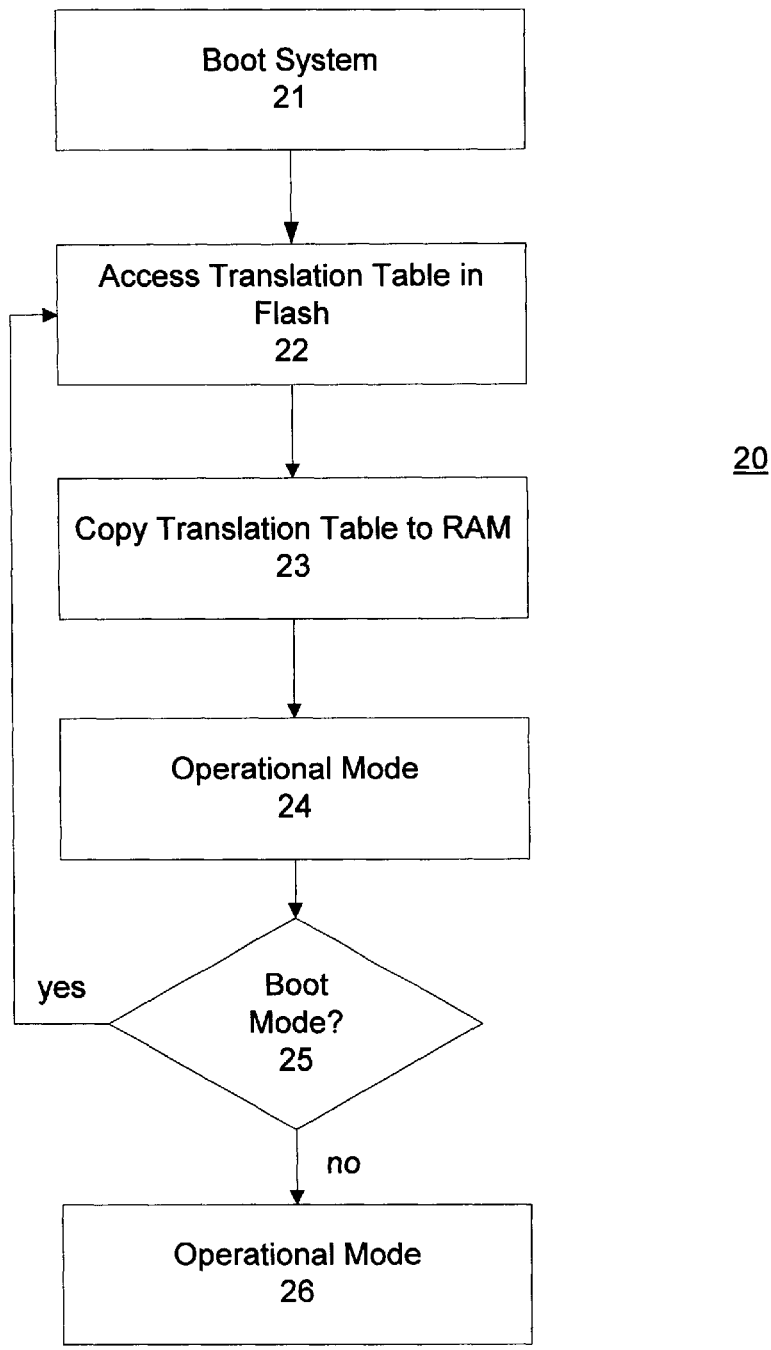
FIG. 2 shows a flowchart of one embodiment of the page table shadowing technique.

FIG. 2 shows a flowchart of the page table shadowing implementation. The system automatically boots 21 after system startup or reset. After bootup, the page tables are accessed 22 in flash memory. Copies of the page tables are then copied to RAM 23. Thus, the page tables are only accessed from flash EEPROM immediately after bootup under normal operation. Once the page tables are copied to RAM, the system is placed in operational mode 24 and the page tables can be accessed from RAM. After the MMU is turned on, the EEPROM and the RAM have the same physical address because of the page table mappings. Because the page tables are now accessed from RAM, flash EEPROM may be programmed at the same time without fear of system errors.

The page tables will not be accessed from EEPROM again unless the system needs to be reloaded or a firmware upgrade is requested 25. Should either of these circumstances occur, the system will again access the page tables from flash 22 and go through the procedure of copying the page tables to RAM. Otherwise, the system will continue operation in the operational mode 26. A portable digital audio player is typically in the operation mode 26 during playback.

Figure 3:
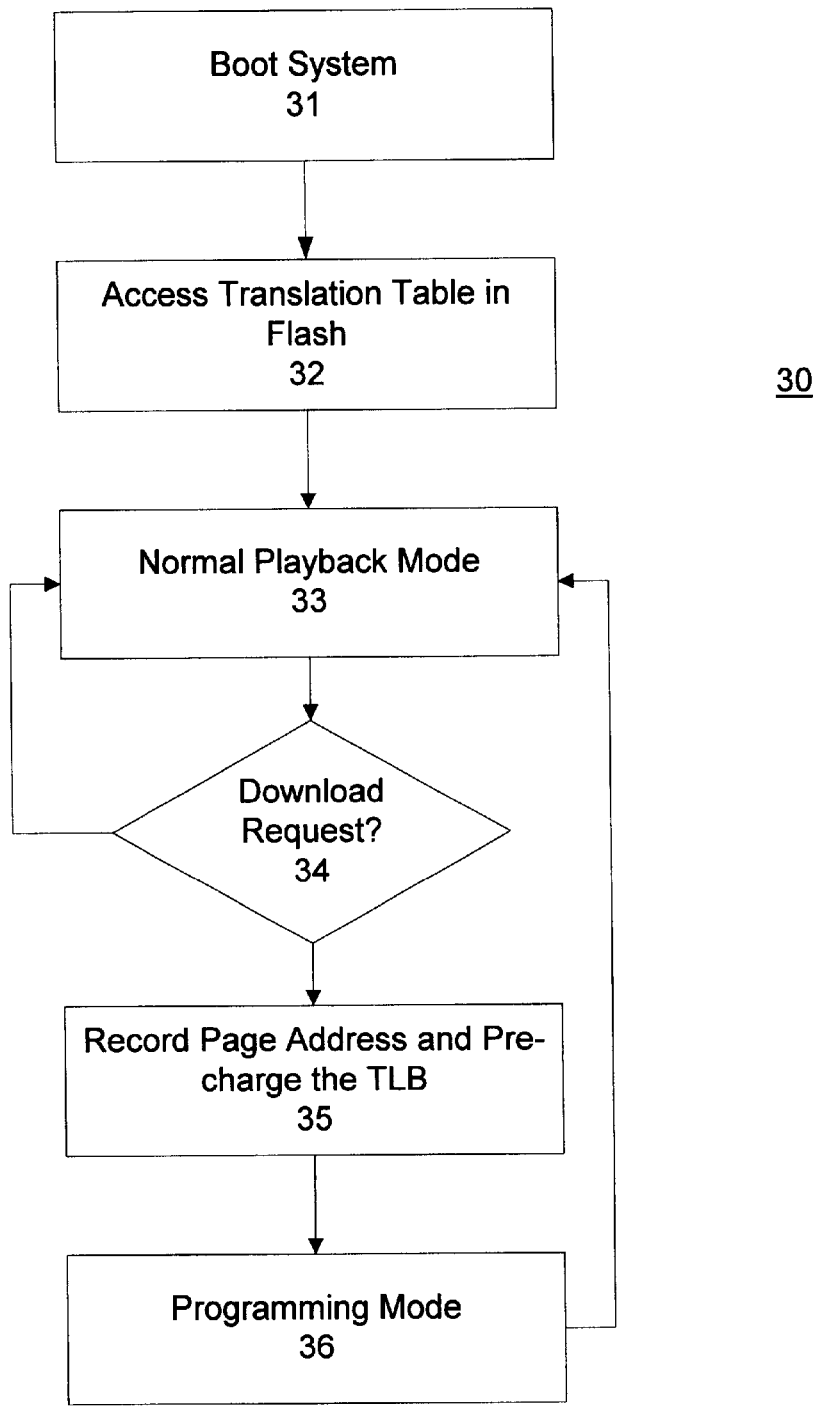
FIG. 3 shows a flowchart of one embodiment of the pre-charge technique.

In another embodiment of the invention, a TLB pre-charge routine is implemented before programming a new flash page. The pre-charge algorithm is depicted in FIG. 3. After system boot 31, the page tables are accessed in flash 32. However, rather than copying the page tables into RAM as in the previous embodiment of the invention, the system enters into the normal playback mode 33.

The TLB may be loaded as needed in the normal playback mode since the flash memory is not in the process of being programmed. In the event that a download request is made 34, the page address is recorded and the TLB is pre-charged 35 for flash data programming. The pre-charge routine loops several times through the list of common page addresses determined by the programmer during inspection. The common page addresses identified are pre-charged. The addresses of the pages to be programmed are read each time through the loop and also precharged. If a TLB is flushed during a pass, the TLB location is reloaded by a subsequent pass.

As previously mentioned, there are 64 TLBs in the MMU. Only one TLB is flushed on each pass. Therefore, at least 63 other TLBs must be flushed before a newly loaded TLB will be eligible for flushing. Looping at least one time for each page address in the common list and each address to be programmed will ensure that each TLB is pre-charged for all pages to be accessed during the download/program process.

By using a special TLB pre-charge routine 35 before programming a new flash page, the need for shadowing the page table in RAM is eliminated. Removing the need for page table shadowing eliminates the cost and size of RAM based page tables. The pre-charge algorithm works best if the MMU has a linear memory allocation method and the number of TLBs needed at a given time is less than the total available.

Following the pre-charge, the system enters into the programming mode 36. During downloading, the information stored in each TLB stays constant since each TLB was already pre-loaded by the pre-charge routine. The algorithm returns to the normal playback mode 33 after downloading is completed.

Embodiments of the present invention may be implemented in hardware or software, or a combination of both. However, preferably, embodiments of the invention may be implemented in computer programs executing on programmable computer systems each comprising at least one processor, a data storage system (including volatile and non-volatile memory and/or storage elements), at least one input device, and at least one output device. Program code may be applied to input data to perform the functions described herein and generate output information. The output information may be applied to one or more output devices, in known fashion.

Each program may be implemented in a high level procedural or object oriented programming language to communicate with the computer system. However, the programs may be implemented in assembly or machine language, if desired. In any case, the language may be a compiled or interpreted language.

Each such computer program may be stored on a storage media or device (e.g., hard disk drive, floppy disk drive, read only memory (ROM), CD-ROM device, flash memory device, digital versatile disk (DVD), or other storage device) readable by a general or special purpose programmable computer system, for configuring and operating the computer system when the storage media or device is read by the computer system to perform the procedures described herein. Embodiments of the invention may also be considered to be implemented as a machine-readable storage medium, configured for use with a computer system, where the storage medium so configured causes the computer system to operate in a specific and predefined manner to perform the functions described herein.

In the foregoing specification the invention has been described with reference to specific exemplary embodiments thereof. It will, however, be evident that various modification and changes may be made thereto without departure from the broader spirit and scope of the invention as set forth in the appended claims. The specification and drawings are, accordingly, to be regarded in an illustrative rather than restrictive sense.

What is claimed is:

1. A method comprising:

booting a computer system;

accessing page tables in flash memory;

placing the computer system in an operation mode;

recording a page address if a programming request is made to the page address in the flash memory;

pre-charging a plurality of translation look-aside buffers (TLB) located in the flash memory; and programming flash memory.

2. The method of claim 1, wherein the pre-charge routine loops n times, wherein n is an integer greater than 1.

3. The method of claim 1, wherein information stored in the TLB remains constant during flash programming.

4. The method of claim 1, wherein a Memory Management Unit (MMU) allocates the memory space located in the flash memory.

5. The method of claim 4, wherein the MMU has a linear memory allocation method.

6. The method of claim 1, wherein the number of TLB needed at a given time is less than the total available.

7. The method of claim 1, wherein the operational mode is a playback mode.

8. The method of claim 7, further comprising:

returning to the playback mode after programming is complete.

9. A computer system, comprising:

a nonvolatile memory to store program code and data, wherein the nonvolatile memory is coupled to bus; and a central processing unit (CPU) coupled to the bus, wherein the CPU accesses a translation table of the nonvolatile memory after bootup and places the system in a playback mode;

wherein a page address is recorded and the translation table of the nonvolatile memory is pre-charged if a download request is received by the CPU; and wherein the CPU places he computer system in a programming mode after pre-charge of the translation table of the nonvolatile memory is complete.

10. The computer system of claim 1, wherein the CPU returns the computer system to the playback mode after downloading is complete.

* * * * *